(12) United States Patent
Chowdhury

(10) Patent No.: US 10,142,839 B1
(45) Date of Patent: Nov. 27, 2018

(54) LOCATION-BASED SECURITY AND CONTEXT IN COMMUNICATION SESSIONS

(71) Applicant: Amazon Technologies, Inc., Reno, NV (US)

(72) Inventor: Muhammad Iftekher Chowdhury, North York (CA)

(73) Assignee: Amazon Technologies, Inc., Reno, NV (US)

( * ) Notice: Subject to any disclaimer, the term of this patent is extended or adjusted under 35 U.S.C. 154(b) by 156 days.

(21) Appl. No.: 14/287,768

(22) Filed: May 27, 2014

(51) Int. Cl.
| | |
|---|---|
| *H04W 12/08* | (2009.01) |
| *H04W 4/021* | (2018.01) |
| *H04L 12/18* | (2006.01) |
| *G06F 21/62* | (2013.01) |
| *H04L 29/06* | (2006.01) |

(52) U.S. Cl.
CPC ........... *H04W 12/08* (2013.01); *H04W 4/021* (2013.01); *G06F 21/62* (2013.01); *G06F 21/6218* (2013.01); *H04L 12/1845* (2013.01); *H04L 63/107* (2013.01)

(58) Field of Classification Search
CPC ....... H04L 63/20; H04L 63/08; H04L 63/107; H04L 63/0227; H04L 12/1845; G06F 21/62; G06F 21/6218; H04W 12/08; H04W 4/021
See application file for complete search history.

(56) References Cited

U.S. PATENT DOCUMENTS

| | | | | |
|---|---|---|---|---|
| 2007/0087797 A1* | 4/2007 | Van Luchene | .......... | A63F 13/12 463/1 |
| 2010/0056183 A1* | 3/2010 | Oh | ....................... | H04L 12/1818 455/456.3 |
| 2010/0175112 A1* | 7/2010 | Loeb | ..................... | H04L 63/101 726/4 |
| 2010/0223124 A1* | 9/2010 | Swanson | ................ | G06Q 30/02 705/14.42 |
| 2011/0317593 A1* | 12/2011 | Bonkowski | ......... | H04L 12/1827 370/260 |
| 2013/0009994 A1* | 1/2013 | Hill | ......................... | G06N 3/006 345/633 |
| 2014/0304784 A1* | 10/2014 | Harrison | ............. | H04L 63/0492 726/5 |

* cited by examiner

*Primary Examiner* — Ayoub Alata
(74) *Attorney, Agent, or Firm* — Eversheds Sutherland (US) LLP

(57) ABSTRACT

Aspects of the disclosure provide security to electronic communication sessions, and/or context-aware transactions based at least on the association of such sessions with respective locations in a virtual environment representative of a geographic region. The geographic region can comprise real-world locations or virtual-world locations. Various strengths of secured access to a communication session can be provided based on accuracy criteria between a prior configured location and a location supplied to request access.

20 Claims, 6 Drawing Sheets

LOCATION-BASED SECURITY AND CONTEXT IN COMMUNICATION SESSIONS

BACKGROUND

Conventional chat sessions generally provide an exchange of messages carrying content (e.g., text and/or images) and arranged in a temporal sequence, where each exchanged message generally is time-stamped. Not only do such sessions lack contextual relevancy, but they also generally fail to permit or otherwise provide a rich interaction with parties other than those participating in a chat session.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

Figure 1:
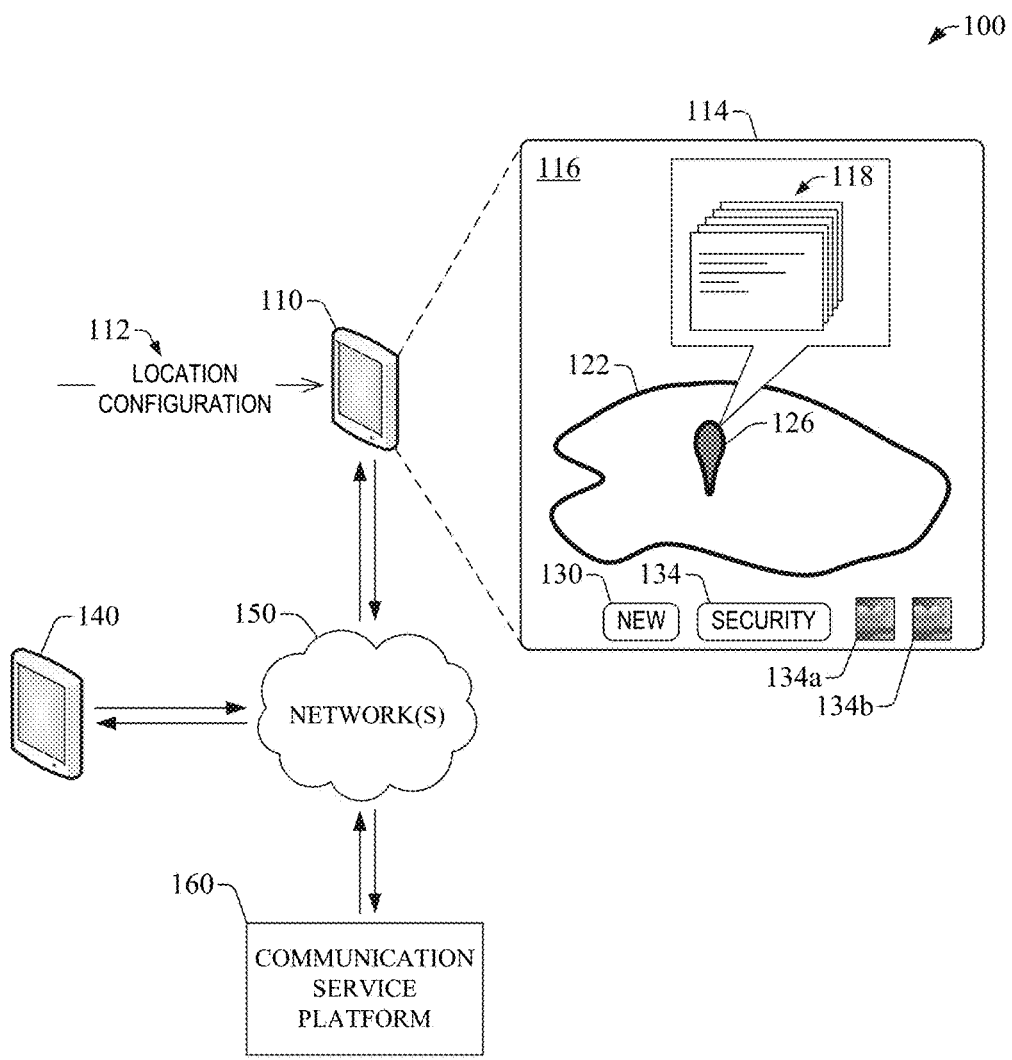
FIGS. 1-2 illustrate an example of an operational environment for electronic communication sessions in accordance with one or more aspects of the disclosure.

The disclosure recognizes and addresses, in at least certain aspects, the lack of contextual relevancy and rich multi-party interactivity of conventional chat sessions. More particularly, yet not exclusively, the disclosure recognizes that chat sessions typically fail to incorporate location-based context, which generally is embedded in real-world conversations.

As described in greater detail below, the disclosure provides embodiments for electronic communication sessions that can be secured and/or can be rendered context-aware via association of such sessions with respective virtual locations. In certain aspects, the disclosure permits an association of an electronic communication session, such as an exchange of messages containing text, images, and/or sound, with a virtual location. The virtual location can provide context to the electronic communication session and can permit categorizing a group of electronic communication sessions according to the virtual location. In addition, the virtual location can permit secured access to the electronic communication session via the virtual location itself As described herein, in certain aspects, virtual locations can be embodied in or can include a representation of real-world locations or virtual-world locations, where the virtual location may be provided within a virtual environment. In certain aspects, various strengths of secured access can be achieved based at least on an access rule that establishes a criterion for the accuracy with which a virtual location associated with a communication session is to be provided in order to gain access to an electronic communication session. For instance, a stringent access rule for access to existing communication sessions can establish that a virtual location be provided strictly as originally associated with an electronic communication session in order to render the communication session, a portion thereof, or a listing of communication sessions associated with the virtual location. In contrast, lax access rules also can be contemplated. For instance, an access rule can establish that providing any virtual location within a geographic region can permit access to one or more electronic communication sessions in the region. In addition to access rules or other security criteria, the disclosure can provide media indications (e.g., indicia or media) that can be related to the selected virtual location, and thus can elicit a recollection of the selected virtual location for an old electronic communication session.

In addition or in the alternative to security features, the association of an electronic communication session with a virtual location can provide context for the session because participants in the electronic communication session may be interested in the virtual location as a reference for the content exchanged within the electronic communication session. For instance, an electronic communication session associated with a virtual location representative of the location of a hotel bar can convey that the context of the participants may relate to travel, either leisure travel or business travel. Accordingly, in one aspect, the association of a virtual location to an electronic communication session provides context that may be leveraged or otherwise utilized to supply advertisement and/or incentives, and/or promote certain types of electronic transactions.

Figure 2:
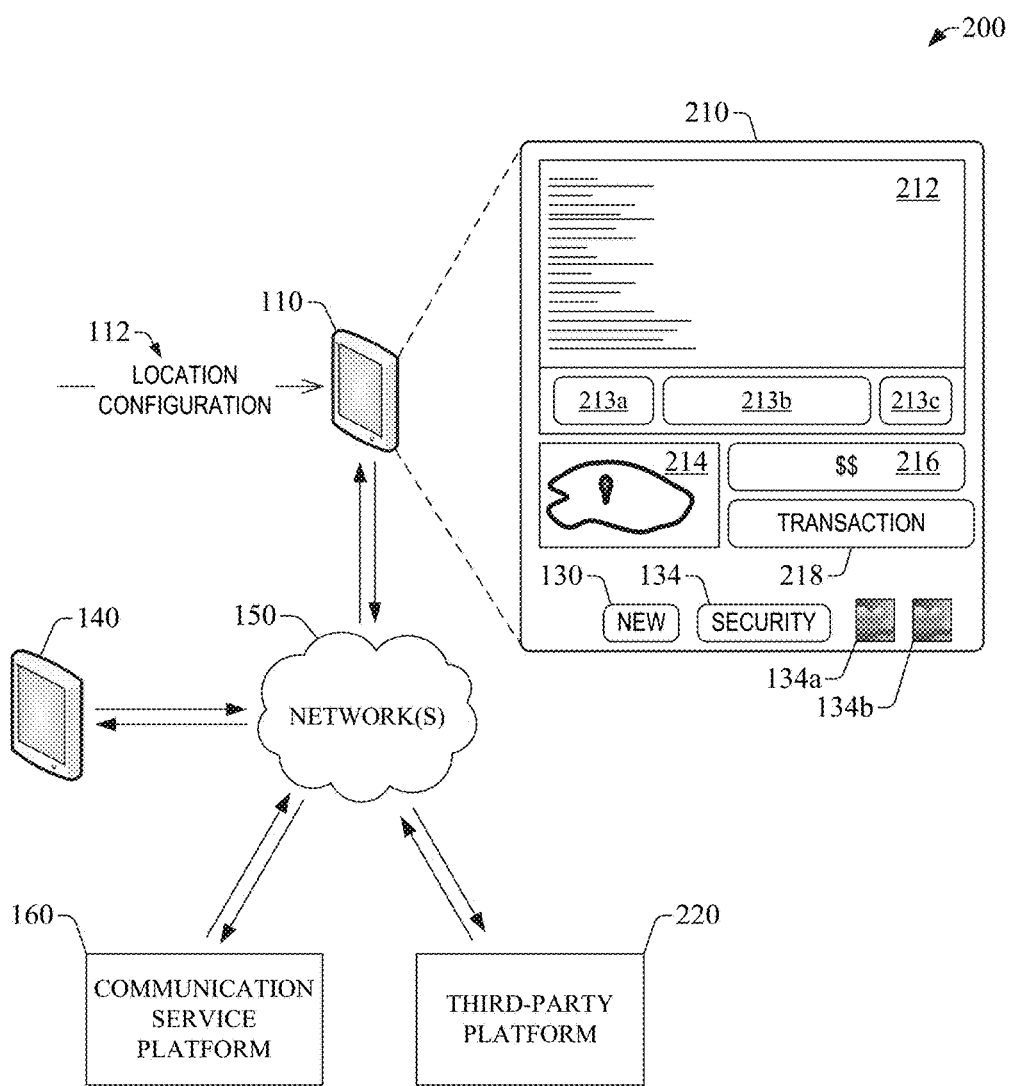

With reference to the drawings, FIGS. 1-2 illustrate examples of operational environments for an electronic communication session in accordance with one or more aspects of the disclosure. The electronic communication session, which may be referred to as a "communication session," can include an electronic exchange of content (such as media) between two or more electronic devices. Each of the devices can include computing resources, such as one or more processors and one or more memory devices, and communication resources, such as communication devices (e.g., a system bus, a memory bus, or the like) and/or input/output interface(s). Electronic devices in accordance with aspects of the disclosure can be embodied in wireless computing devices (e.g., mobile computing devices, including portable and/or wearable computing devices) or tethered computing devices.

Figure 3:
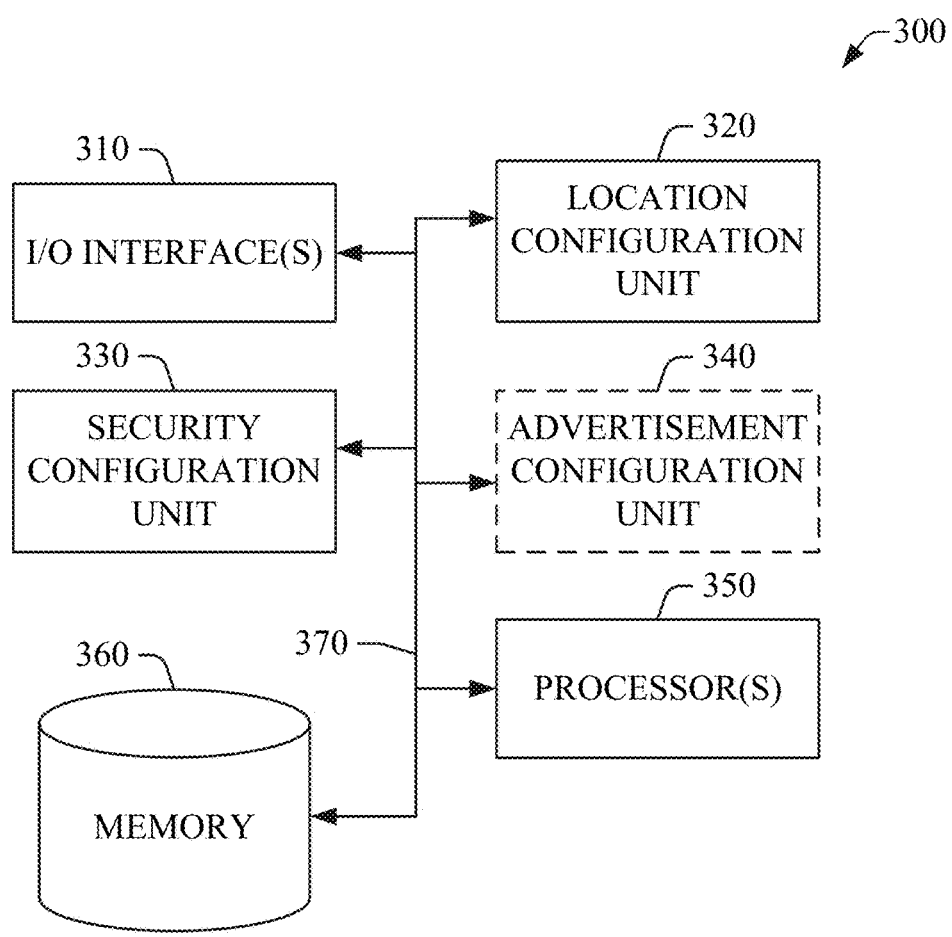
FIG. 3 illustrates an example of an embodiment of a computing device for electronic communication sessions in accordance with one or more aspects of the disclosure.

In the operational environment 100 illustrated in FIG. 1, an electronic device 110 can permit establishing a communication session, such as a chat session, with an electronic device 140 via one or more networks 150 in accordance with aspects of this disclosure. The one or more networks 150 can include wireless and/or wired communication networks having various footprints (e.g., wide area network (WAN), metropolitan area network (MAN), a local area network (LAN), a home area network (HAN), and/or a personal area network (PAN)). In order to establish the communication session, in one aspect, the electronic device 110 can provide an interface 116 that can permit selection of a location within a virtual environment 114 representative of a geographic region 122. In one example embodiment, the interface 116 can be embodied in or can include a display device that can render a graphical user interface that conveys the information associated with the interface 116. For instance, in one implementation, the example embodiment 300 shown in FIG. 3 can embody or can constitute the electronic device 110, and such a display device can be embodied in or can include at least one of the one or more of the input/output (I/O) interfaces 310. The geographic region 122 can be indicative or otherwise representative of a real-world region and/or a virtual-world region, and can have a specific footprint. For instance, the geographic region 122 can be associated with a continent, a country, a state or a province, a county, a city, a neighborhood, a facility (such as a shopping mall, a factory, or the like), and so forth.

In one aspect, the geographic region 122 can be leveraged to configure a location to be associated with a communication session (e.g., a chat session). For example, the electronic device 110 can receive location configuration information 112 (which may be referred to as location configuration 112) that can permit selection of the location to be associated with the communication session. Such information may be received via a user interface of the electronic device 110, such as a display surface thereof, through one or more inputs, touches, or gestures, and can specify the location to be associated with the communication session. For instance, in one implementation, the example embodiment 300 shown in FIG. 3 can embody or can constitute the electronic device 110, and such a user interface can be embodied in or can include an I/O interface of the I/O interface(s) 310. The location configuration 112 can convey a specific location within the geographic region 122. For instance, the location configuration 112 can convey an address within the geographic region 122, where the address represents the location 126. In addition or in the alternative, the configuration information 112 can provide signaling (e.g., inputs, touches, screen swipes, screen taps, gestures, combinations thereof, or the like) that can permit navigation of the geographic region 122 and/or selection of the location 126 (e.g., a place of reference, such as a museum, a restaurant, a coffee shop, an entertainment venue, or the like) to be associated or otherwise assigned to a communication session. In one example, selection of the location within the virtual environment 114 can include a search for the location within a group of one or more predetermined locations in the virtual environment. In one aspect, a menu or listing of the group of one or more locations can be rendered in the interface 116, and the location configuration 112 can include signaling (e.g., a gesture, a screen tap or swipe, a screen click, or the like) that can permit specifying a selection from the menu or listing. In another example, selection of the location within the virtual environment 114 can include generation of the location in the virtual environment 114. As such, in one aspect, the position within the geographic region 122 can be selected or otherwise identified, and information indicative of the location that is generated can be received at the electronic device 110. For instance, in one implementation in which the example embodiment 300 in FIG. 3 embodies or constitutes the electronic device 110, the location configuration unit 320 can select a location within the virtual environment 114 representative of the geographic region 122 based at least on the configuration information 112 in accordance with one or more aspects of this disclosure.

In certain embodiments, at least a portion of the location configuration 112 can be generated by the electronic device 110 and can include a current location of the electronic device 110. For example, such a current location can be determined based on navigation information (e.g., timing information) observed or otherwise acquired by the electronic device 110 or one or more components thereof, such as a receiver for signaling from a global navigation satellite system (GNSS) (e.g., a global positioning system (GPS), Galileo, the Russian GLONASS, the Indian Regional Navigational Satellite System, the Chinese Compass navigation system, or the like) or other location-based service signaling. In an example, the electronic device 110 can assign the current location of the electronic device 110 to a communication session between the electronic device 110 and other electronic devices. As an illustration, in an implementation in which the example embodiment 300 in FIG. 3 embodies or constitutes the electronic device 110, the location configuration unit 320 and/or at least one of the processor(s) 350 can determine the current location of the electronic device 110 based on such navigation information. To at least such an end, in one aspect, the location configuration unit 320 and/or the at least one of the processor(s) 350 can leverage or otherwise utilize methods, such as triangulation methods, available in one or more memory devices 360 (also referred to as memory 360).

In certain implementations, in response to selection of the location 126, a communication session can be initiated and the location 126 can be associated with or otherwise assigned to the communication session (e.g., a chat session). As such, in one aspect, the interface 114 can include indicia 130 (or any other media or interface element) that can be actuated to cause the electronic device 110 to initiate the communication session. As illustrated, the indicia 130 is pictorially represented with the term "new" in order to convey that actuation or other interaction with the indicia 130 can initiate a new communication session associated with the location 126 that is selected. In one example embodiment, the electronic device 110 can convey information (e.g., data and/or metadata) representative or otherwise indicative of the location 126 to a communication service platform 160 that implements the communication session, and the communication service platform 160, or a component thereof (e.g., a location service server), can associate or otherwise map the location 126 to the communication session. In another example embodiment, the electronic device 110 can associate or otherwise map the location 126 to the communication session, and can convey association information indicative of the association or mapping to the communication service platform 160 or can retain such information locally within the electronic device 110. In either of such example embodiments, the communication session can be categorized or otherwise catalogued based at least on the location 126. As an illustration, in the operational environment 100, a group of one or more communication sessions 118 is associated to the location 126. A communication session in accordance with aspects of this disclosure can include a series or group of messages or information blocks. As an illustration, in an implementation in which the example embodiment 300 in FIG. 3 embodies or constitutes the electronic device 110, the location configuration unit 320 can map the location 126 to a communication session. In one example scenario, the location configuration unit 320 can retain or otherwise store a mapping of locations and chat sessions within the memory 360. In one example, such a mapping can represent a categorization of chat session (or, more generally, an electronic communication session) based on location. In another example scenario, the location configuration unit 320 can push or otherwise communicate, via at least one of the I/O interface(s) 310, mapping information indicative of an association between the location 126 and a communication session to the communication service platform 160. In one aspect, the communication service platform 160 can include a component similar or identical to the location configuration unit 320 that can receive the mapping information and can retain at least a portion of such information in one or more memory devices integrated into or functionally coupled to the communication service platform.

In another aspect, the location configuration 112 can include information that can configure the visibility of, or accessibility to, a communication session, a portion of the communication session, and/or a listing including the communication session, potentially after completion thereof. In one example, the location configuration 112 can convey one or more access criteria, and the electronic device 110 can assign or otherwise associate at least one of the one or more access criteria to the communication session. In addition or in the alternative, the configuration information 112 can provide signaling (e.g., information indicative of swipes, taps, combinations thereof, or the like) that can permit actuation of certain indicia, such as security 134, that is rendered at the interface 114. Such an actuation can permit configuration of an access criterion or rule for a communication session that is being initiated. An access criterion can be embodied in or can include a spatial criterion that establishes a permissible disparity between a location that is provided for access to a communication session or retrieval of a historical communication session and the actual location that is associated with the (historical) communication session. The lesser such a disparity, the more restricted the access to a communication session may be. For instance, in an example scenario in which the permissible disparity is null, the location that is provided for access to a communication session may have to be identical to the actual location associated with the communication session. In contrast, in an example scenario in which any disparity is permissible, any location can permit access to a historical or otherwise extant communication session. In such a scenario, any historical or otherwise extant communication session may be accessible and thus, access to the communication session or a portion thereof may be referred to as "universal." As an example, in an implementation in which the example embodiment 300 in FIG. 3 embodies or constitutes the electronic device 110, the security configuration unit 330 can assign or otherwise associate access rules to respective communication sessions. In one example scenario, the security configuration unit 330 can retain or otherwise store a group of one or more access rules respectively associated with one or more chat sessions (contemporaneous and/or historical) within the memory 360. In another example scenario, the security configuration unit 330 can push or otherwise communicate, via at least one of the I/O interface(s) 310 and at least one of the network(s) 150, accessibility information indicative of one or more access rules associated with one or more communication sessions to the communication service platform 160. In one aspect, the communication service platform 160 can include a component similar or identical to the security configuration unit 330 that can receive the accessibility information and can retain at least a portion of such information in one or more memory devices integrated into or functionally coupled to the communication service platform.

In one aspect of accessing a communication session, in response to receiving information indicative of a location within the geographic region 122, the electronic device 110 can determine if the location fulfills one or more access criteria or can request the communication service platform 160 or a component thereof to perform such a determination. In either of such determination modalities, for a location that satisfies the one or more criteria, or any predetermined access rule(s), the electronic device 110 can render, for example, a listing of one or more communication sessions associated with such a location (e.g., location 126) and/or at least a portion of at least one of such communication session(s). In the alternative, information related to a communication session may not be rendered when the location fails to satisfy at least one of the one or more access criteria.

Accordingly, an access criterion or a visibility criterion as described herein can secure a communication session of an end-user of the electronic device 110 because access to the communication session can be permitted only for locations that are provided with sufficient accuracy with respect to an actual location associated with the communication session. Even if the end-user has access to the owner or creator of a communication session, the end-user may be prevented, depending on the spatial stringency of the access criterion, from accessing a communication session unless some knowledge of the location assigned to the communication session is available. In one example, the owner or creator of the communication session may be the owner, lessor, or otherwise authorized user of the electronic device 110. As described herein, the location 126 that is associated with a communication session can be a real-world location (e.g., a café, a mall, a theater, or the like) or a virtual-world location (e.g., a fictitious place found on books, movies, and the like). As such, in one aspect, the large set of locations from which a virtual location may be selected can make it extremely difficult to extract or otherwise find a communication session (e.g., a chat session) for someone who lacks knowledge of an actual location related to the communication session.

In one aspect, in response to selection of a location, e.g., location 126, within the geographic region 122, an indicia or other content (e.g., an image, such as a picture or a street view; a sound; a combination thereof; or the like) can be linked or otherwise associated with the selected location. In certain embodiments, the electronic device 110 can communicate information (e.g., data, metadata, and/or signaling) indicative of a location selection to the communication service platform 160. In response, the communication service platform 160 can supply, e.g., generate and/or communicate, information indicative of the indicia or content to the electronic device 110, which in turn can render the indicia or content, e.g., icons 134a-134b, in the interface 114. Such indicia or content can be referred to as a media representation or media indication of the location that is selected, and can elicit in an end-user a recollection of the location with which a communication session is associated, and can permit more readily accessing such a communication session.

The association of a virtual location with a communication session (e.g., a chat session) in accordance with aspects of the disclosure can provide context to such a session. In one aspect, information representative or indicative of the virtual location can define or otherwise constitute the context. In certain operational environments, e.g., operational environment 200 shown in FIG. 2, a third-party platform 220 can utilize or otherwise leverage the context afforded by the virtual location. The third-party platform 220 can be associated with an entity affiliated with the virtual location—e.g., an owner of the virtual location and/or a real location associated therewith, a lessee of the location, a performer (such as a musician or a band) in the real location associated with the virtual location, or the like—and can provide (e.g., communicate) promotional content to the parties participating in the communication session. In one example, the promotional content can include advertisements and/or incentives (such as coupons, buy-one-get-one (BOGO) offers or other types of offers, or the like). Certain promotional content can be deemed to be "passive" in that no electronic commercial transaction (or end-user action) can be effected from such content, and other promotional content can be deemed to be "active" in that an electronic commercial transaction can be elicited and/or effected from such content. The promotional content, either passive or active, can be supplied to the communication session in the form of one or more impressions 216 (pictorially represented with "$$" in FIG. 2) at the interface 210 associated with the communication session. It should be appreciated that the advertisement may be intrinsically targeted because the selection of the virtual location can characterize the parties to the communication session as interested in a theme associated with the virtual location. For instance, if the virtual location is embodied in the locale of a coffee shop, the parties to the communication session 212 may be coffee enthusiasts. Similarly, if the virtual location is embodied in a locale of a movie theater, the parties to the communication session 212 may be interested in concession foodstuffs, for example. Accordingly, the virtual location, e.g., location 126, can provide context to the advertisement or other promotional content communicated to the electronic device 110 and an end-user that participates in a communication session via the electronic device 110.

In addition, in certain embodiments, actuation or other forms of interaction with at least one of the impression(s) 216 can configure or otherwise cause the electronic device 110 to block or otherwise preclude rendering of promotional content at the interface 210 (which may be referred to as to "toggle off" the promotional content). In such embodiments, the promotional content may be permitted (which may be referred to as "toggle on" the promotional content) by actuating or otherwise interacting with indicia (not shown in FIG. 2) rendered at the interface 210. In additional or alternative embodiments, actuation of other forms of interaction with at least one of the impression(s) 216 can configure one or more preferences for delivery and/or rendering of advertisements. In one example, such preference(s) can include an indication whether or not promotional content can be supplied; type of promotional content; number of advertisements and/or incentives per electronic communication session; a combination thereof; or the like. As an illustration, in an implementation in which the example embodiment 300 in FIG. 3 embodies or constitutes the electronic device 110, an advertisement configuration unit 340 (which may be optional) can toggle on and/or off the promotional content. As such, in one example scenario, the advertisement configuration unit 340 can collect or otherwise receive visibility information indicative or otherwise representative of a preference to render promotional content or a preference to preclude rendering the promotional content. In one example, at least a portion of such visibility information can be retained or otherwise stored in the memory 360. In addition, the advertisement configuration unit 340 can push or otherwise communicate, via at least one of the I/O interface(s) 310 and at least one of the network(s) 150, the visibility information to a third-party platform 220. Based on such information, the third-party platform 220 can configure delivery or can preclude delivery of promotional content to the electronic device 110. In one example, configuration of delivery of advertisements can include configuration of an indication (e.g., a data structure or record) that conveys that communication of delivery of promotional content to the electronic device 110 is permitted; configuration of type of promotional content that can be delivered; configuration of amount of promotional content that can be delivered; a combination thereof; or the like. Accordingly, in one aspect, the third-party platform 220 can include a component similar or identical to the advertisement configuration unit 340 that can receive the visibility information and can leverage or otherwise utilize such information to configure communication of promotional content to the electronic device 110 in accordance with one or more aspects of this disclosure.

As illustrated in FIG. 2, the communication session 212 can be rendered (e.g., displayed, played-back, or the like) in an interface, which is pictorially represented by a rectangular boundary surrounding the communication session 212. Such an interface can include interface elements, such as indicia or additional graphical interfaces 213*a*-213*c*, that can permit rendering rich content (e.g., images, motion pictures, audio segments, and the like) in addition to text (which is pictorially represented with straight segments) that may constitute the communication session 212. It should be appreciated that the number, location, and/or other aspects of such interface elements can be greater than or less than those represented in FIG. 2.

In addition, in one example, the virtual location associated with a communication session (which may be a contemporaneous or historical communication session) can be rendered in an area 214 within the interface 210. In certain embodiments, actuation of or other interaction with the area 214 or a portion thereof can permit selection of and/or transition to another virtual location. A new communication session may be initiated at the other location, or as described herein, a historical or otherwise extant communication session may be accessed at the other location based on at least one access rule for rendering or otherwise accessing communications sessions associated with respective locations.

The incentives that may be present in the promotional content communicated to the electronic device 110 can have monetary value, and the entity affiliated with the virtual location can utilize such incentives to drive transactions in a real-world location or within the operational environment 200. For example, if an end-user of the electronic device 110 spends a certain amount of time in a virtual coffee shop with another party (e.g., an end-user of the electronic device 140), the end-user of the electronic device 110 may be provided with a discount (e.g., a 5% discount) on a next purchase at a real-world location of the coffee shop. For another example, the entity affiliated with the virtual location can leverage or otherwise utilize the third-party platform 220 to present the end-users of the electronic devices 110 and 140 with offers or other incentives within an interface in which the communication session 212 is rendered. In a scenario in which a selected virtual location (which may be represented via the rendered area 214 at the interface 210) is embodied in the locale of a theater or a café, the third-party platform 220 can supply (e.g., communicate or otherwise convey) offers to the end-users of the electronic devices 110 and 140 while the communication session 212 is in progress. The offers can include, for example, offers for the purchase of movie tickets, food packages, other product or services, combinations thereof, or the like.

In addition, the incentives provided via the impression(s) 216 can permit the third-party platform 220 to generate one or more popularity metrics, such as the number of times a certain virtual location has been selected to be associated with a communication session. An entity associated with the virtual location and a related real-world location can cross-publicize such metrics, presenting them, for example, in real-world locations (e.g., "10,000 people visited our place online this week") in order to convey the popularity of both the real-world location and the virtual-world location.

As illustrated, the interface 210 can render indicia 218 that, in response to actuation or other form of interaction with an end-user (e.g., an input, a touch, a gesture, or a finger swipe from the end-user) of the electronic device 110, can cause an electronic transaction (e.g., a purchase) between the electronic device 110 and the third-party platform 220 or a component thereof. The electronic transaction can permit one or more of the end-users engaged in a communication session to benefit from incentives or other offers provided by the third-party platform 220—e.g., the purchase of discounted movie tickets at a 20% discount. In addition, the electronic transaction can permit the end-users to respond to an offer as it is presented via an interface in which the communication session is rendered. Moreover, the electronic transaction can permit the end-users to divide the expenses associated with purchasing advertised goods, for example.

Figure 4:
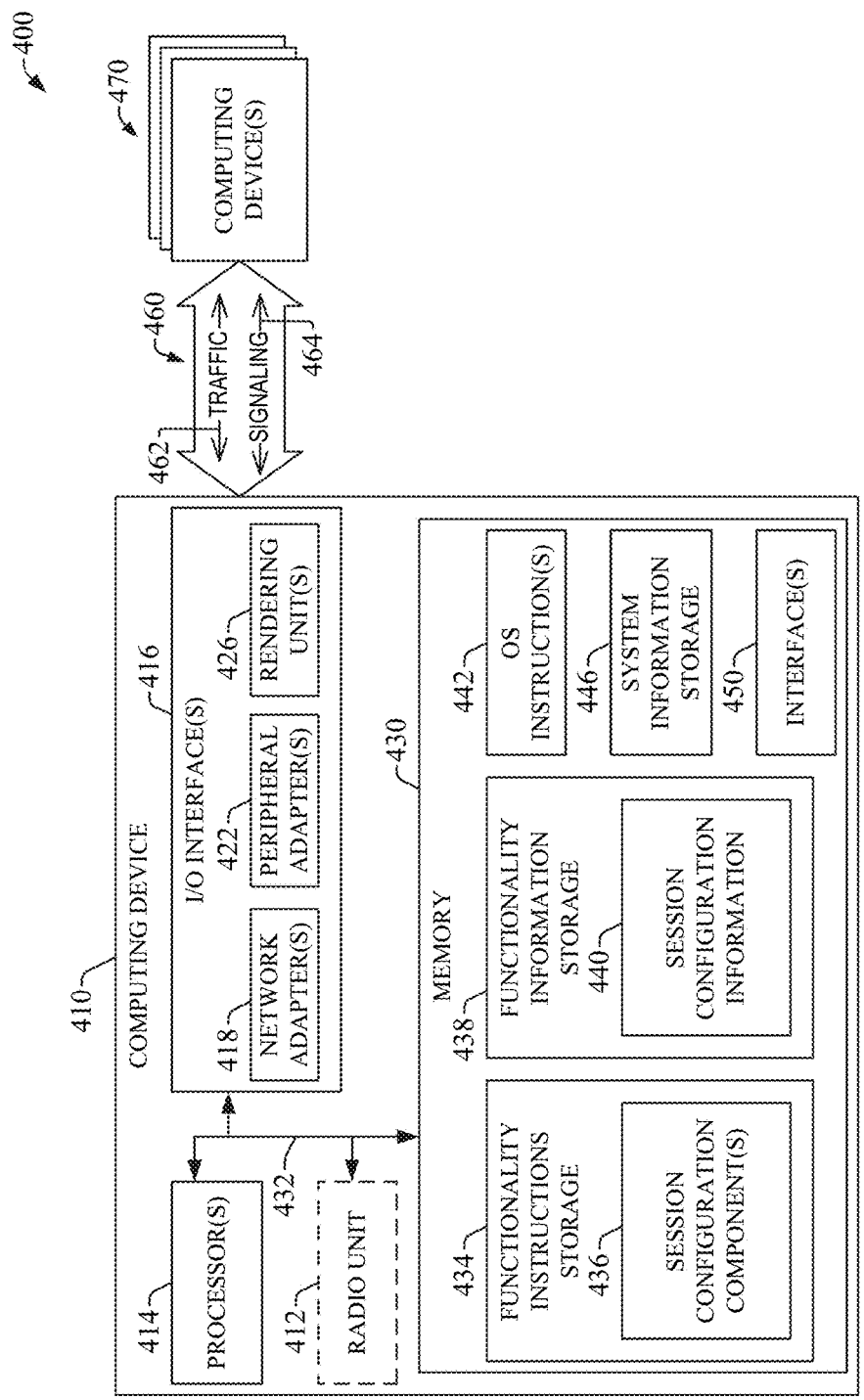
FIG. 4 illustrates an example of a computational environment for electronic communication sessions in accordance with one or more aspects of the disclosure.

FIG. 4 illustrates a block diagram of an example computational environment 400 for secure and context-aware communication sessions based on virtual locations in accordance with one or more aspects of the disclosure. The example computational environment 400 is merely illustrative and is not intended to suggest or otherwise convey any limitation as to the scope of use or functionality of the computational environment's architecture. In addition, the illustrative computational environment depicted in FIG. 4 should not be interpreted as having any dependency or requirement relating to any one or combination of components illustrated in the example operational environments of the disclosure. The example computational environment 400 or portions thereof can embody or can comprise, for example, the electronic device 110, the electronic device 140, the communication service platform 160, and/or the third-party platform 220.

The computational environment 400 represents an example implementation of the various aspects or features of the disclosure in which the processing or execution of operations described in connection with the electronic communication sessions secured and/or rendered context-aware via virtual locations disclosed herein can be performed in response to execution of one or more software components at the computing device 410. It should be appreciated that the one or more software components can render the computing device 410, or any other computing device that contains such components, a particular machine for electronic communication sessions secured and/or rendered context-aware via virtual locations as described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example methods presented in FIGS. 5-6. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the electronic communication sessions secured and/or rendered context-aware via virtual locations described herein can comprise personal computers; server computers; laptop devices; handheld computing devices, such as mobile tablets or electronic-book readers (e-readers); wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 410 can comprise one or more processors 414, one or more input/output (I/O) interfaces 416, a memory 430, and a bus architecture 432 (also termed bus 432) that functionally couples various functional elements of the computing device 410. In certain embodiments, the computing device 410 can include, optionally, a radio unit 412. The radio unit 412 can include one or more antennas and a communication processing unit that can permit wireless communication between the computing device 410 and another device, such as one of the computing device(s) 470. The bus 432 can include at least one of a system bus, a memory bus, an address bus, or a message bus, and can permit exchange of information (data, metadata, and/or signaling) between the processor(s) 414, the I/O interface(s) 416, and/or the memory 430, or respective functional elements therein. In certain scenarios, the bus 432 in conjunction with one or more internal programming interfaces 450 (also referred to as interface(s) 450) can permit such exchange of information. In scenarios in which processor(s) 414 include multiple processors, the computing device 410 can utilize parallel computing.

The I/O interface(s) 416 can permit communication of information between the computing device and an external device, such as another computing device, e.g., a network element or an end-user device. Such communication can include direct communication or indirect communication, such as exchange of information between the computing device 410 and the external device via a network or elements thereof. As illustrated, the I/O interface(s) 416 can comprise one or more of network adapter(s) 418, peripheral adapter(s) 422, and rendering unit(s) 426. Such adapter(s) can permit or facilitate connectivity between the external device and one or more of the processor(s) 414 or the memory 430. For example, the peripheral adapter(s) 422 can include a group of ports, which can include at least one of parallel ports, serial ports, Ethernet ports, V.35 ports, or X.21 ports. In certain embodiments, the parallel ports can comprise General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 418 can functionally couple the computing device 410 to one or more computing devices 470 via one or more traffic and signaling pipes 460 that can permit or facilitate exchange of traffic 462 and signaling 464 between the computing device 410 and the one or more computing devices 470. Such network coupling provided at least in part by the at least one of the network adapter(s) 418 can be implemented in a wired environment, a wireless environment, or both. The information that is communicated by the at least one of the network adapter(s) 418 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 470 can have substantially the same architecture as the computing device 410. In addition or in the alternative, the rendering unit(s) 426 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 410, or can permit conveying or revealing the operational conditions of the computing device 410.

In one aspect, the bus 432 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 432, and all buses described herein can be implemented over a wired or wireless network connection and each of the subsystems, including the processor(s) 414, the memory 430 and memory elements therein, and the I/O interface(s) 416 can be contained within one or more remote computing devices 470 at physically separate locations, connected through buses of this form, in effect implementing a fully distributed system. In certain embodiments, such a distributed system can implement the functionality described herein in a client-host or client-server configuration in which the session configuration component(s) 436 or the session configuration information 440, or both, can be distributed between the computing device 410 and at least one of the computing device(s) 470, and the computing device 410 and at least one of the computing device(s) 470 can execute such components and/or leverage such information. In certain implementation of a client-server embodiment, a client computing device can include one or more of the session communication component(s) 436 embodying or constituting at least one of the location configuration unit 320, the security configuration unit 330, or the advertisement configuration unit 340, and forming a client (e.g., electronic device 110) for electronic communication sessions in accordance with aspects of this disclosure. Similarly, a server computing device can include one or more of the session communication component(s) 436 embodying or constituting at least one of the location configuration unit 320, the security configuration unit 330, or the advertisement configuration unit 340, and forming a server (e.g., communication session platform 160 and/or third-party platform 220) for electronic communication sessions in accordance with aspects of this disclosure.

The computing device 410 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 410, and can comprise, for example, both volatile and non-volatile media, and removable and/or non-removable media. In one aspect, the memory 430 can comprise computer-readable media in the form of volatile memory, such as random access memory (RAM), and/or non-volatile memory, such as read-only memory (ROM).

The memory 430 can comprise functionality instructions storage 434 and functionality information storage 438. The functionality instructions storage 434 can comprise computer-accessible instructions that, in response to execution (by at least one of the processor(s) 414), can implement one or more of the functionalities of the disclosure. The computer-accessible instructions can embody or can comprise one or more software components illustrated as communication session configuration component(s) 436. In one scenario, execution of at least one component of the communication session configuration component(s) 436 can implement one or more of the methods described herein, such as example method 400. For instance, such execution can cause a processor (e.g., one of the processor(s) 414) that executes the at least one component to carry out a disclosed example method. It should be appreciated that, in one aspect, a processor of the processor(s) 414 that executes at least one of the communication session configuration component(s) 436 can retrieve information from or retain information in one or more memory elements 440 in the functionality information storage 438 in order to operate in accordance with the functionality programmed or otherwise configured by the communication session configuration component(s) 436. The one or more memory elements 440 may be referred to as session configuration information 440. Such information can include at least one of code instructions, information structures, or the like. For instance, at least a portion of such information structures can be indicative of a mapping or categorization of communication session and virtual locations; access rules; and/or preferences for promotional content.

In certain embodiments, one or more of the communication session configuration component(s) 436 (which may also be referred to as session configuration component(s) 436) can embody or can constitute at least one of the location configuration unit 320, the security configuration unit 330, or the advertisement configuration unit 340, and can provide the functionality of such units in accordance with aspects of this disclosure. In other embodiments, one or more of the communication session configuration component(s) 436 in combination with at least one of the processor(s) 414 can embody or can constitute at least one of the location configuration unit 320, the security configuration unit 330, or the advertisement configuration unit 340, and can provide the functionality of such units in accordance with aspects of this disclosure.

At least one of the one or more interfaces 450 (e.g., application programming interface(s)) can permit or facilitate communication of information between two or more components within the functionality instructions storage 434. The information that is communicated by the at least one interface can result from implementation of one or more operations in a method of the disclosure. In certain embodiments, one or more of the functionality instructions storage 434 and the functionality information storage 438 can be embodied in or can comprise removable/non-removable, and/or volatile/non-volatile computer storage media.

At least a portion of at least one of the communication session configuration component(s) 436 or communication session configuration information 440 can program or otherwise configure one or more of the processors 414 to operate at least in accordance with the functionality described herein. One or more of the processor(s) 414 can execute at least one of the communication session configuration component(s) 436 and leverage at least a portion of the information in the functionality information storage 438 in order to provide electronic communication sessions secured and/or rendered context-aware via virtual locations in accordance with one or more aspects described herein.

It should be appreciated that, in certain scenarios, the functionality instruction(s) storage 434 can embody or can comprise a computer-readable non-transitory storage medium having computer-accessible instructions that, in response to execution, cause at least one processor (e.g., one or more of the processor(s) 414) to perform a group of operations comprising the operations or blocks described in connection with the disclosed methods.

In addition, the memory 430 can comprise computer-accessible instructions and information (e.g., data, metadata, and/or programming code instructions) that permit or facilitate the operation and/or administration (e.g., upgrades, software installation, any other configuration, or the like) of the computing device 410. Accordingly, as illustrated, the memory 430 can comprise a memory element 442 (labeled operating system (OS) instruction(s) 442) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 410 can dictate a suitable OS. The memory 430 also comprises a system information storage 446 having data, metadata, and/or programming code that permits or facilitates the operation and/or administration of the computing device 410. Elements of the OS instruction(s) 442 and the system information storage 446 can be accessible or can be operated on by at least one of the processor(s) 414.

It should be recognized that while the functionality instructions storage 434 and other executable program components, such as the OS instruction(s) 442, are illustrated herein as discrete blocks, such software components can reside at various times in different memory components of the computing device 410, and can be executed by at least one of the processor(s) 414. In certain scenarios, an implementation of the communication session configuration component(s) 436 can be retained on or transmitted across some form of computer-readable media.

The computing device 410 and/or one of the computing device(s) 470 can include a power supply (not shown), which can power up components or functional elements within such devices. The power supply can be a rechargeable power supply, e.g., a rechargeable battery, and it can include one or more transformers to achieve a power level suitable for the operation of the computing device 410 and/or one of the computing device(s) 470, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 418) to connect operationally to the conventional power grid. In another aspect, the power supply can include an energy conversion component, such as a solar panel, to provide additional or alternative power resources or autonomy for the computing device 410 and/or one of the computing device(s) 470.

The computing device 410 can operate in a networked environment by utilizing connections to one or more remote computing devices 470. As an illustration, a remote computing device can be a personal computer, a portable computer, a server, a router, a network computer, a peer device or other common network node, and so on. As described herein, connections (physical and/or logical) between the computing device 410 and a computing device of the one or more remote computing devices 470 can be made via one or more traffic and signaling pipes 460, which can comprise wired link(s) and/or wireless link(s) and several network elements (such as routers or switches, concentrators, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 470) that are functionally coupled (e.g., communicatively linked or otherwise coupled) through a network having traffic and signaling pipes and related network elements. In a distributed computing environment, in one aspect, one or more software components (such as program modules) can be located in both a local computing device 410 and at least one remote computing device.

Figure 5:
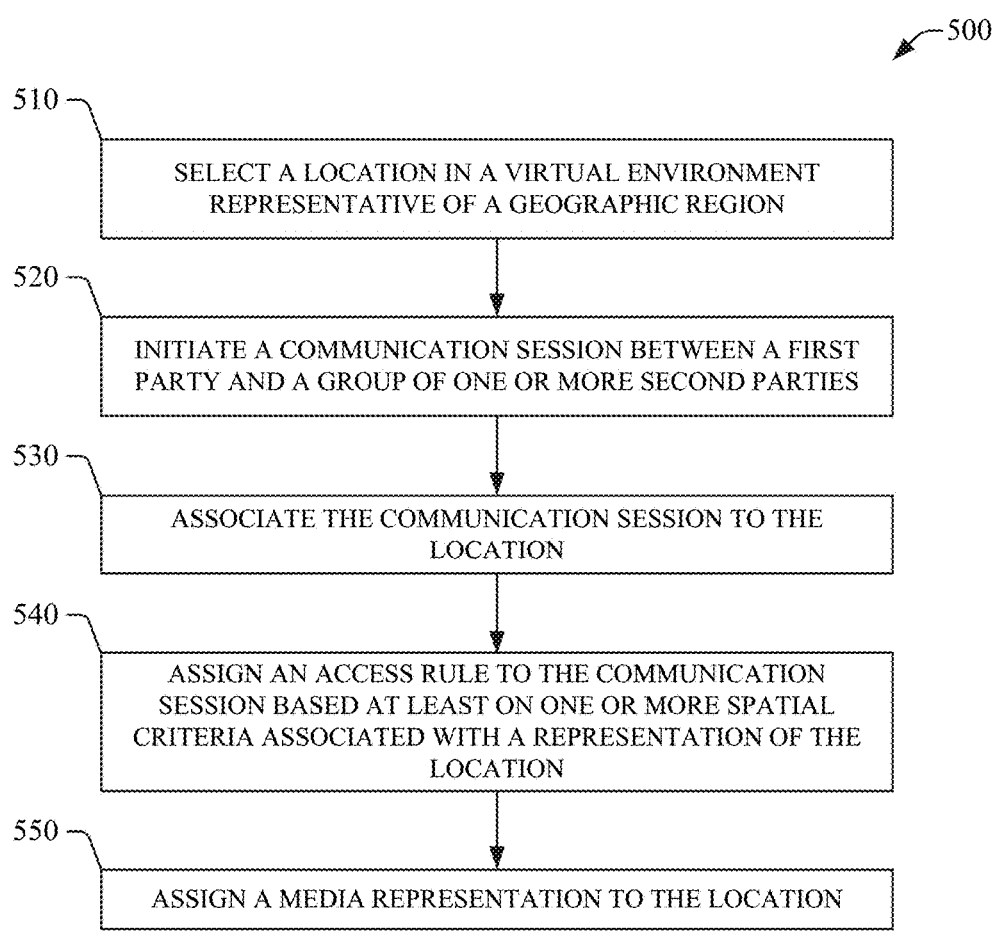
FIGS. 5-6 illustrate examples of methods for electronic communication sessions in accordance with the one or more aspects of the disclosure.
Figure 6:
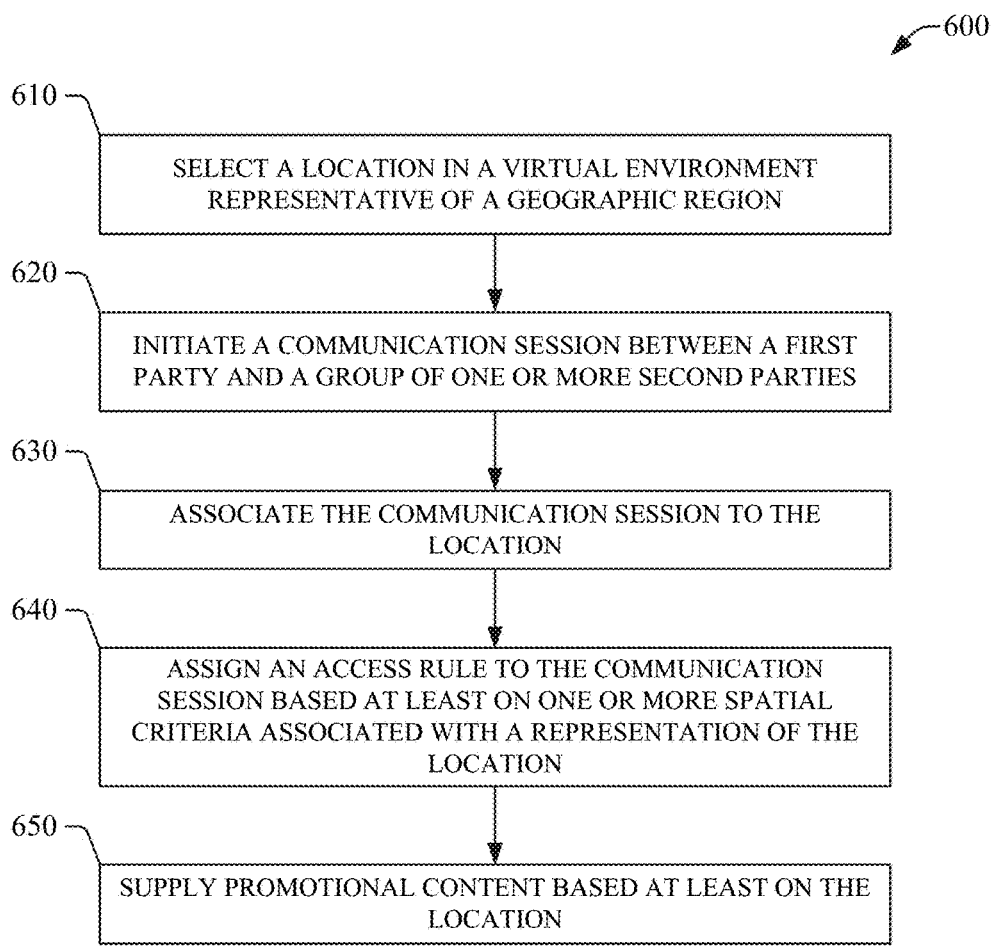

In view of the aspects described herein, example methods that can be implemented in accordance with the disclosure can be better appreciated with reference, for example, to the flowcharts in FIGS. 5-6. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods in accordance with this disclosure can be retained on an article of manufacture, or computer-readable medium, to permit or facilitate transporting and transferring such methods to a computing device (e.g., a desktop computer; a mobile computer, such as a tablet, or a smartphone; a gaming console; a mobile telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more of the disclosed methods. The code instructions can provide a computer-executable or machine-executable framework to implement the methods described herein.

FIGS. 5-6 present flowcharts of example methods for electronic communication sessions (e.g., chat sessions) according to at least certain aspects of the disclosure. One or more computing devices (e.g., electronic device 110 or 140) having one or more processors or being functionally coupled to at least one processor can implement (e.g., compile, execute, compile and execute, etc.) one or more blocks of the example method 500 and/or the example method 500. In one embodiment, for example, the computing device 310 can implement the subject example method. In other scenarios, one or more blocks of the example method 500 and/or the example method 500 can be implemented in a distributed fashion by two or more computing devices contained in a computing system. Each of the two or more computing devices can have at least one processor or can be functionally coupled to at least one processor, where such processor(s) can implement at least one of the one or more blocks. With reference to the example method 500, at block 510, a location in a virtual environment representative of a geographic region can be selected. As described herein, the location can be or can include a real-world location or a virtual-world location. At block 520, an electronic communication session (which also may be referred to as "communication session") between a first party (e.g., a first electronic device, such as electronic device 110) and a group of one or more second parties (e.g., second electronic device(s), such as electronic device 140) can be initiated. At block 530, the communication session can be associated with the location that is selected. In one example, associating the communication session to such a location can include categorizing or otherwise classifying the communication session according to the location.

At block 540, an access rule can be assigned to the communication session based at least on one or more spatial criteria associated with a representation of the location. As described herein, in one aspect, the access rule can control or otherwise regulate access to or visibility (such as the rendering) of the communication session, a portion of the communication session, and/or a listing including the communication session, potentially after completion thereof. As such, the access rule can secure the communication session, with the location effectively representing a security credential for the electronic communication session. In certain embodiments, the access rule can provide universal access (e.g., open access to an end-user) to the communication session or a portion thereof. In one example, at least one of the one or more spatial criteria can determine or otherwise define a spatial tolerance for a disparity between the selected location in the virtual environment and a representation of a location received from at least one of a first electronic device associated with the first party or a second electronic device associated with one of the group of one or more second parties.

At block 550, a media representation (e.g., indicia 134a, 134b) can be assigned to or otherwise associated with the location that is selected. The media indication can be embodied in or can include indicia or other content (such as an image, a video segment, or an audio segment). As described herein, the media indication can function to elicit a recollection of the location with which the communication session is associated.

In connection with the example method 600, blocks 610-640 are respectively similar or identical to blocks 510-540, which are described herein. At block 650, promotional content based at least on the location that is selected in the virtual environment can be supplied. The promotional content can include advertisement and/or incentives (such as coupons, BOGO offers or other types of offers; price discounts; loyalty-program currency (e.g., points, airmiles, non-monetary currency, such as loyalty dollars); other types of offers; or the like). In certain implementations, the promotional content can be supplied by the computing device (e.g., electronic device 110 or 140) that implements the subject example method. For instance, such a computing device can inject such content into the communication session (e.g., a chat session) that is initiated at block 620 and which is associated with the selected location at block 630. The injected content can be rendered in the form of one or more impressions at an interface that renders or otherwise conveys the communication session. In other embodiments, the promotional content can be supplied (e.g., generated and communicated) by an remote computing device, where at least a portion of the promotional content can be supplied based at least in part on preferences received by the remote computing device from the computing device that implements the subject example method and is functionally coupled (e.g., communicatively connected) to the electronic communication session. Such preferences can include an indication whether or not advertisements can be supplied; type of advertisements, number of advertisements per electronic communication session; a combination thereof; or the like.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into onto a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. An interface can include input/output (I/O) components as well as associated processor, application, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques that can provide electronic communication sessions secured and/or rendered context-aware via virtual locations. It is, of course, not possible to describe every conceivable combination of elements and/or methods for purposes of describing the various features of the disclosure, but it can be recognize that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
   selecting, by a computing system comprising one or more processors, a virtual-world location in a virtual environment representative of a geographic region;
   initiating, by the computing system, a chat session between a first electronic device and at least one second electronic device;
   associating, by the computing system, the chat session to the virtual-world location in the virtual environment, wherein the associating comprises categorizing the chat session according at least to the virtual-world location;
   assigning, by the computing system, an access rule to the chat session based on a spatial tolerance for a disparity between the virtual-world location in the virtual environment and a selectable representation of the virtual-world location received from at least one of the first electronic device or the at least one second electronic device, the access rule controlling a rendering of the chat session; and
   receiving, by the computing system, a promotion associated with a real-world product or a real-world location, wherein the real-world product or the real-world location is based at least in part on the virtual-world location.

2. The method of claim 1, further comprising assigning, by the computing system, a visual indication to the virtual-world location in the virtual environment.

3. The method of claim 1, wherein the selecting the virtual-world location in the virtual environment comprises generating a configurable location in the virtual environment.

4. The method of claim 1, wherein the categorizing comprises generating mapping information indicative of a correspondence between a category of the chat session and the virtual-world location.

5. A method, comprising:
   selecting, by a computing system of a first electronic device comprising one or more processors, a virtual-world location in a virtual environment representative of a geographic region;
   initiating, by the computing system, an electronic communication session between the first electronic device and a second electronic device;
   associating, by the computing system, the electronic communication session to the virtual-world location in the virtual environment, wherein the associating comprises categorizing the electronic communication session according to the virtual-world location;
   assigning, by the computing system, an access rule to the electronic communication session based at least in part on the virtual-world location and a defined representation of the virtual-world location, the access rule controlling access to the electronic communication session; and
   receiving, by the computing system, a promotion associated with a real-world product or a real-world location, wherein the real-world product or the real-world location is based at least in part on the virtual-world location.

6. The method of claim 5, further comprising assigning a media representation to the virtual-world location in the virtual environment.

7. The method of claim 5, wherein the selecting the virtual-world location in the virtual environment comprises searching for the virtual-world location within a group of predetermined locations in the virtual environment.

8. The method of claim 5, wherein the selecting the virtual-world location in the virtual environment comprises generating the virtual-world location in the virtual environment.

9. The method of claim 5, wherein the assigning the access rule to the electronic communication session comprises configuring a spatial criterion associated with a disparity between the virtual-world location and a representation of a second location received from an electronic device requesting access to the electronic communication session.

10. The method of claim 5, wherein receiving the promotion further comprises receiving, by the computing system, an advertisement based at least on the virtual-world location in the virtual environment.

11. The method of claim 5, wherein receiving the promotion further comprises receiving, by the computing system, an incentive based at least on the virtual-world location in the virtual environment.

12. The method of claim 5, wherein the categorizing comprises mapping a category of the electronic communication session to the virtual-world location.

13. An apparatus, comprising:
   at least one memory device having instructions encoded thereon; and
   at least one processor functionally coupled to the at least one memory device and configured, by the instructions, to at least:
      select a virtual-world location in a virtual environment representative of a geographic region;
      initiate an electronic communication session between the apparatus and an electronic device;
      associate the electronic communication session to the virtual-world location in the virtual environment, wherein an association between the electronic communication session and the virtual-world location comprises information indicative of a mapping between a category of the electronic communication session and the virtual-world location;

assign an access rule to the electronic communication session based at least in part on the virtual-world location and a defined representation of the virtual-world location, the access rule controlling access to the electronic communication session; and receive a promotion associated with a real-world product or a real-world location, wherein the real-world product or the real-world location is based at least in part on the virtual-world location.

14. The apparatus of claim 13, wherein the at least one processor is further configured, by the instructions, to assign a media representation to the virtual-world location in the virtual environment.

15. The apparatus of claim 13, wherein the at least one processor is further configured, by the instructions, to:

receive location information from a navigation platform comprising a global navigation satellite system, and determine the virtual-world location in the virtual environment from at least a portion of the location information.

16. The apparatus of claim 13, wherein the at least one processor is further configured, by the instructions, to configure a spatial criterion associated with a disparity between the virtual-world location and the representation of the virtual-world location received from an electronic device requesting access to the electronic communication session.

17. The apparatus of claim 13, wherein to receive the promotion comprises to receive an advertisement based at least on the virtual-world location in the virtual environment.

18. The apparatus of claim 17, wherein the at least one processor is further configured, by the instructions, to preclude receiving the advertisement based at least in part on preferences received from an electronic device functionally coupled to the electronic communication session.

19. The apparatus of claim 13, wherein to receive the promotion comprises receiving an incentive based at least on the virtual-world location in the virtual environment.

20. The apparatus of claim 13, wherein the at least one processor is further configured, by the instructions, to receive the promotion from a third-party platform device associated with the virtual-world location.

* * * * *